（12） United States Patent
Han et al.

(10) Patent No.: US 12,196,429 B2
(45) Date of Patent: Jan. 14, 2025

(54) OVEN AND COOKING METHOD THEREFOR

(71) Applicant: SAMSUNG ELECTRONICS CO., LTD., Suwon-si (KR)

(72) Inventors: Jeongsu Han, Suwon-si (KR); Junhoe Choi, Suwon-si (KR); Taegyoon Noh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 820 days.

(21) Appl. No.: 17/421,117

(22) PCT Filed: Jan. 31, 2020

(86) PCT No.: PCT/KR2020/001483
§ 371 (c)(1),
(2) Date: Jul. 7, 2021

(87) PCT Pub. No.: WO2020/159281
PCT Pub. Date: Aug. 6, 2020

(65) Prior Publication Data
US 2022/0120444 A1 Apr. 21, 2022

(30) Foreign Application Priority Data
Feb. 1, 2019 (KR) .................. 10-2019-0013841

(51) Int. Cl.
*F24C 7/08* (2006.01)
*F24C 3/12* (2006.01)
(Continued)

(52) U.S. Cl.
CPC .............. *F24C 7/085* (2013.01); *F24C 3/128* (2013.01); *G01B 11/02* (2013.01); *G01N 21/255* (2013.01); *G01N 2201/0627* (2013.01)

(58) Field of Classification Search
CPC .......... F24C 3/128; F24C 7/085; G01B 11/02; G01N 21/255
See application file for complete search history.

(56) References Cited

U.S. PATENT DOCUMENTS 5,373,145 A  12/1994  Endo et al.
5,512,736 A * 4/1996  Kang .................. H05B 6/6464
                                              219/754
(Continued)

FOREIGN PATENT DOCUMENTS

CN       1108023 A    9/1995
CN     108139080 A    6/2018
(Continued)

OTHER PUBLICATIONS

International Search Report dated May 19, 2020 from International Application No. PCT/KR2020/001483.
(Continued)

*Primary Examiner* — Thien S Tran
(74) *Attorney, Agent, or Firm* — STAAS & HALSEY LLP

(57) ABSTRACT

An oven has a sensor including a light-emitting portion for outputting light in a first wavelength band and light in a second wavelength band and a light-receiving portion for receiving light reflected from a cooking product in the oven. A processor to, when a user command for initiating cooking is input, output the light in the first wavelength band through the light-emitting portion. When the light output from the light-emitting portion is reflected from the cooking product and received by the light-receiving portion, the processor determines the size of the cooking product on the basis of the received light in the first wavelength band, and outputs the light in the second wavelength band through the light-emitting portion while the cooking product is being cooked (Continued)

on the basis of a cooking time determined according to the determined size of the cooking product.

12 Claims, 7 Drawing Sheets

(51) Int. Cl.
  *G01B 11/02* (2006.01)
  *G01N 21/25* (2006.01)

(56) References Cited

U.S. PATENT DOCUMENTS

| | | | |
|---|---|---|---|
| 5,744,786 | A | 4/1998 | Kim |
| 10,908,582 | B2 | 2/2021 | Choi et al. |
| 2015/0359047 | A1 | 12/2015 | Kishimoto et al. |
| 2016/0327281 | A1 | 11/2016 | Bhogal et al. |
| 2018/0172510 | A1 | 6/2018 | Rosen et al. |
| 2018/0180478 | A1 | 6/2018 | Goldring et al. |
| 2018/0210418 | A1 | 7/2018 | Choi et al. |
| 2018/0270918 | A1 | 9/2018 | Kweon et al. |
| 2020/0069111 | A1 | 3/2020 | Eiter et al. |
| 2020/0253415 | A1* | 8/2020 | Stork genannt Wersborg ............ H05B 6/6447 |

FOREIGN PATENT DOCUMENTS

| | | |
|---|---|---|
| DE | 10 2013 102 293 | 9/2014 |
| DE | 10 2013 102 295 | 9/2014 |
| DE | 10 2014 114 901 | 4/2016 |
| DE | 10 2017 206 056 | 10/2018 |
| EP | 0 232 802 A1 | 8/1987 |
| EP | 0 682 243 | 11/1995 |
| GB | 2 267 584 A | 12/1993 |
| JP | 5-346235 A | 2/1993 |
| JP | 7-248120 A | 9/1995 |
| JP | 11-281333 A | 10/1999 |
| JP | 2002-260839 | 9/2002 |
| JP | 2014-152959 A | 8/2014 |
| KR | 1995-0011940 | 5/1995 |
| KR | 19980015200 U * | 9/1996 |
| KR | 1996-0041890 | 12/1996 |
| KR | 10-0133029 | 4/1998 |
| KR | 1998-015200 | 6/1998 |
| KR | 1998-050563 | 9/1998 |
| KR | 10-0206759 | 7/1999 |
| KR | 2000-0005638 | 1/2000 |
| KR | 10-0239242 | 3/2000 |
| KR | 10-2014-0028539 | 3/2014 |
| KR | 10-2018-0088116 | 8/2018 |
| WO | WO 99/53251 | 10/1999 |

OTHER PUBLICATIONS

Written Opinion of the International Searching Authority dated May 19, 2020 from International Application No. PCT/KR2020/001483.
Office Action dated Mar. 3, 2023 for Korean Patent Application No. 10-2019-0013841.
Office Action dated Mar. 16, 2023 for Chinese Patent Application No. 202080007427.8.
Extended European Search Report dated Nov. 18, 2021 from European Patent Application No. 20747646.6.

* cited by examiner

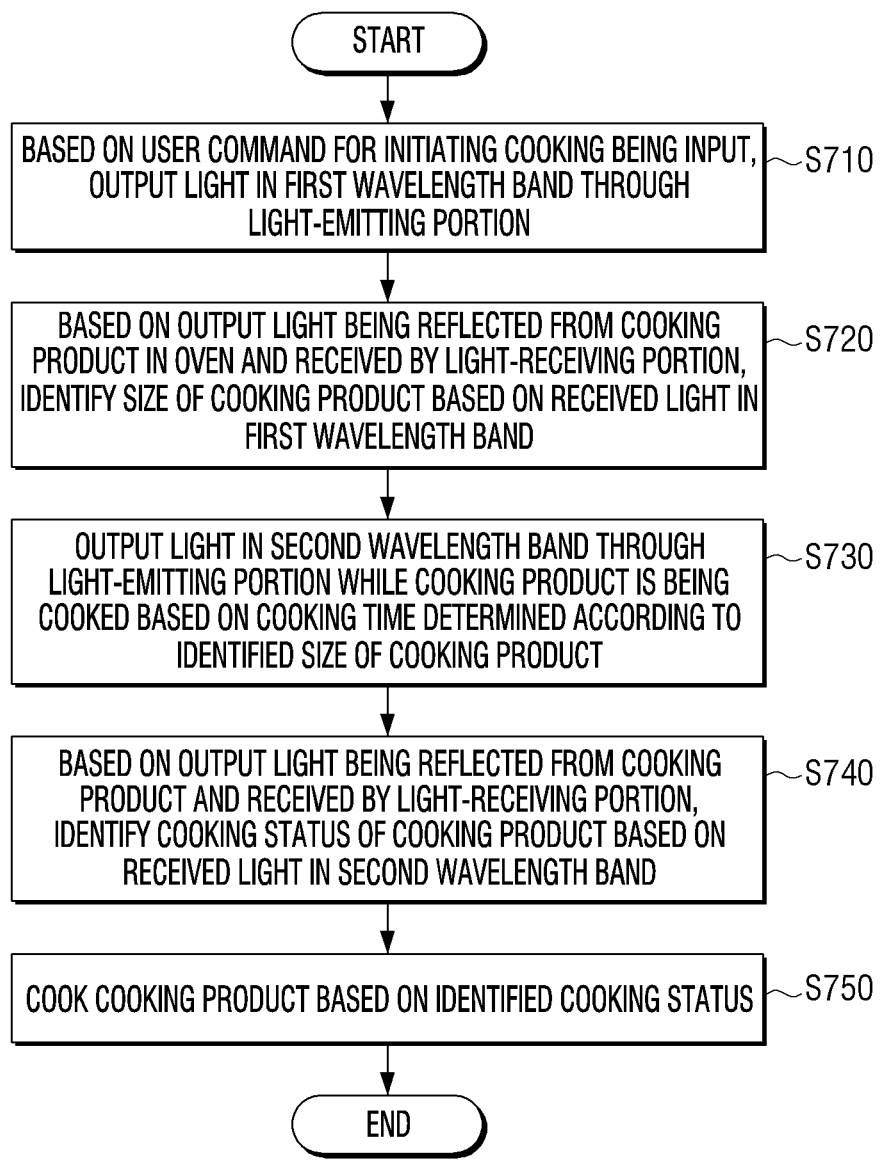

OVEN AND COOKING METHOD THEREFOR

CROSS-REFERENCE TO RELATED APPLICATIONS

This application is a U.S. National Stage Application which claims the benefit under 35 U.S.C. § 371 of International Patent Application No. PCT/KR2020/001483 filed on Jan. 31, 2020, which claims foreign priority benefit under 35 U.S.C. § 119 of Korean Patent Application 10-2019-0013841 filed on Feb. 1, 2019, in the Korean Intellectual Property Office, the contents of both of which are incorporated herein by reference.

TECHNICAL FIELD

This disclosure relates to an oven and a cooking method therefor and, more particularly, to an oven for cooking of a cooking product and a cooking method therefor.

BACKGROUND ART

An oven is a device to perform cooking such as heating a food by applying heat to the food.

In a related-art, if a user selects a type of food to be cooked by the user, the food may be cooked during a cooking time determined according to the type of the selected food.

In this example, the food is cooked during the cooking time determined according to the type of the food regardless of a size of the food, and there may be a problem in that the food is not properly cooked or burned.

There is a necessity to find a way to more efficiently cook food.

DISCLOSURE

Technical Problem

It is an object of the disclosure to provide an oven capable of identifying a size and a cooking status of a cooking product using light and cooking a cooking product accordingly, and a cooking method therefor.

Technical Solution

According to an embodiment, an oven includes a sensor including a light-emitting portion for outputting light in a first wavelength band and light in a second wavelength band and a light-receiving portion for receiving light reflected from a cooking product in the oven; and a processor configured to, based on a user command for initiating cooking being input, output the light in the first wavelength band through the light-emitting portion, and based on the light output from the light-emitting portion being reflected from the cooking product and received by the light-receiving portion, identify a size of the cooking product based on the received light in the first wavelength band, output the light in the second wavelength band through the light-emitting portion while the cooking product is being cooked based on a cooking time determined according to the identified size of the cooking product, based on the output light being reflected from the cooking product and received by the light-receiving portion, identify a cooking status of the cooking product based on the received light in the second wavelength band, and cook the cooking product based on the identified cooking status.

The light in the first wavelength band may be infrared rays, and the light in the second wavelength band may be visible ray.

The light-receiving portion may include a plurality of light-receiving modules arranged in a form of an array.

The processor may, based on a difference between a time at which the light in the first wavelength band is output from the light-emitting portion and a time at which the light in the first wavelength band is reflected from the cooking product and received by the plurality of light receiving modules, identify a distance between the plurality of light receiving modules and the cooking product, and identify a size of the cooking product based on the identified distance.

The processor may determine different cooking times according to the identified size of the cooking product for a type of a cooking product selected based on a user command to initiate the cooking, and the greater the identified size of the cooking product is, the longer the cooking time is.

The processor is may sequentially output lights of different wavelengths in the second wavelength band through the light-emitting portion in each of a plurality of time periods, and based on the lights of different wavelengths being reflected from the cooking product and received by the plurality of light receiving modules, identify a cooking status of the cooking product based on an intensity of the received light.

The processor may identify the cooking status of the cooking product based on a difference of an intensity of the received light by the plurality of light receiving modules.

The processor may identify a wavelength having a greatest difference between an intensity of lights of different wavelengths received by the plurality of light-receiving modules according to the light output from the light-emitting portion in a first time period and an intensity of lights of different wavelengths received by the plurality of light-receiving modules according to the light output from the light-emitting portion in a subsequent time period, among the plurality of times, and based on the difference of the intensity of the light of the identified wavelength being greater than or equal to a preset threshold value, identify that cooking of the cooking product is completed.

The processor may, based on identifying that cooking of the cooking product is completed according to the identified cooking status, stop cooking of the cooking product.

A method of cooking of an oven including a light-emitting portion and a light-receiving portion may include, based on a user command for initiating cooking being input, outputting the light in the first wavelength band through the light-emitting portion, based on the light output from the light-emitting portion being reflected from the cooking product and received by the light-receiving portion, identifying a size of the cooking product based on the received light in the first wavelength band, outputting the light in the second wavelength band through the light-emitting portion while the cooking product is being cooked based on a cooking time determined according to the identified size of the cooking product, based on the output light being reflected from the cooking product and received by the light-receiving portion, identifying a cooking status of the cooking product based on the received light in the second wavelength band, and cooking the cooking product based on the identified cooking status.

The light in the first wavelength band may be infrared rays, and the light in the second wavelength band may be visible ray.

The light-receiving portion may include a plurality of light-receiving modules arranged in a form of an array.

The identifying a size of the cooking product may include, based on a difference between a time at which the light in the first wavelength band is output from the light-emitting portion and a time at which the light in the first wavelength band is reflected from the cooking product and received by the plurality of light receiving modules, identifying a distance between the plurality of light receiving modules and the cooking product, and identifying a size of the cooking product based on the identified distance.

The method may further include determining different cooking times according to the identified size of the cooking product for a type of a cooking product selected based on a user command to initiate the cooking, and the greater the identified size of the cooking product is, the longer the cooking time is.

The identifying the cooking status may include sequentially outputting lights of different wavelengths in the second wavelength band through the light-emitting portion in each of a plurality of time periods, and based on the lights of different wavelengths being reflected from the cooking product and received by the plurality of light receiving modules, identifying a cooking status of the cooking product based on an intensity of the received light.

The identifying the cooking status may include identifying the cooking status of the cooking product based on a difference of an intensity of the received light by the plurality of light receiving modules.

The identifying the cooking status may include identifying a wavelength having a greatest difference between an intensity of lights of different wavelengths received by the plurality of light-receiving modules according to the light output from the light-emitting portion in a first time period and an intensity of lights of different wavelengths received by the plurality of light-receiving modules according to the light output from the light-emitting portion in a subsequent time period, among the plurality of times, and based on the difference of the intensity of the light of the identified wavelength being greater than or equal to a preset threshold value, identifying that cooking of the cooking product is completed.

The method according to an embodiment may further include, based on identifying that cooking of the cooking product is completed according to the identified cooking status, stopping cooking of the cooking product.

Effect of Invention

According to various embodiments as described above, when s user selects only a type of a cooking product to be cooked, the user may optimally cook the cooking product without monitoring the cooking process, even if the user does not know an accurate cooking method.

DESCRIPTION OF DRAWINGS

FIG. 7 is a flowchart illustrating a method of describing a cooking method of an oven according to an embodiment.

BEST MODE FOR CARRYING OUT THE INVENTION

-

MODE FOR CARRYING OUT THE INVENTION

Figure 1:
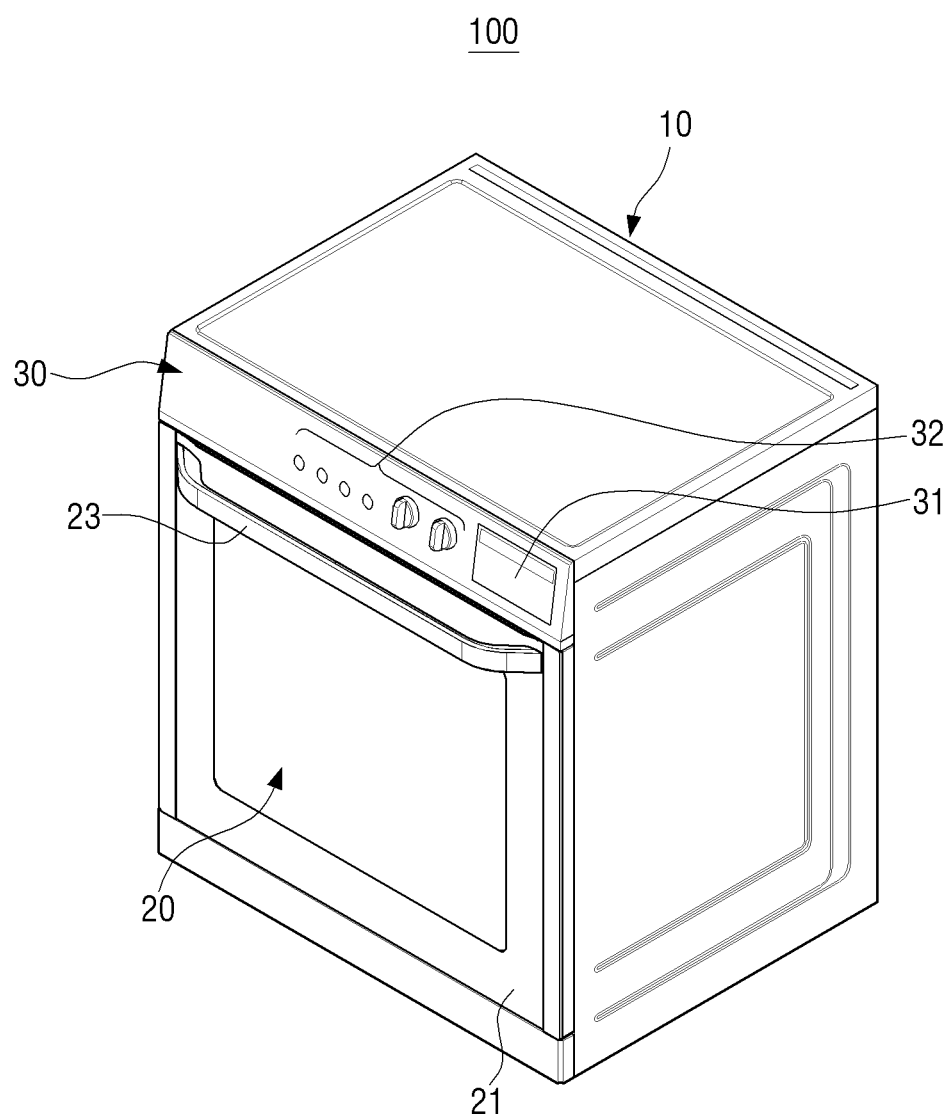
FIG. 1 is a perspective view illustrating an oven according to an embodiment.

Various embodiments will be described with reference to the attached drawings. However, this disclosure is not intended to limit the embodiments described herein but includes various modifications, equivalents, and/or alternatives. In the context of the description of the drawings, like reference numerals may be used for similar components.

In this specification, expressions such as "have," "may have," "include," "may include" or the like represent presence of a corresponding feature (for example, components such as numbers, functions, operations, or parts) and does not exclude the presence of additional feature.

In this document, expressions such as "at least one of A [and/or] B," or "one or more of A [and/or] B," include all possible combinations of the listed items. For example, "at least one of A and B," or "at least one of A or B" includes any of (1) at least one A, (2) at least one B, or (3) at least one A and at least one B.

As used herein, the terms "first," "second," or the like may denote various components, regardless of order and/or importance, and may be used to distinguish one component from another, and does not otherwise limit the components.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

Hereinafter, with reference to the attached drawings, embodiments will be described in detail.

FIG. 1 is a perspective view illustrating an oven according to an embodiment.

An oven 100 illustrated in FIG. 1 is merely exemplary, and the oven may be implemented in various shapes according to various embodiments.

Referring to FIG. 1, the oven 100 may include a main body 10 forming an appearance of the oven 100.

The oven 100 may include a receiving space 20 that is open toward one side. The receiving space 20 of the main body 10 may be a cooking chamber 20 where a cooking product (i.e., food) is cooked, and the cooking chamber 20 may be opened toward the front of the oven 100.

The cooking chamber 20 may be formed of a box shape and a front surface may be opened to insert or withdraw a cooking product. The front surface of the main body 10 may include an opening connected to the cooking chamber 20.

In this example, the front surface of the cooking chamber 20 may be opened and closed by a door 21 connected to the main body 10. The door 21 may be hinge-coupled to a lower portion of the main body 10 so as to be rotatable with respect to the main body 10. A door handle 23, which may be gripped by a user, may be provided on the front surface of the door 21, and the user may grip the door handle 23 to open and close the cooking chamber 20.

A heater for heating the cooking product may be provided in the cooking chamber 20. In this case, the heater may be an electric heater including an electrical resistor. However, the heater is not limited to an electric heater and may be a gas heater that generates heat by burning gas.

A control panel 30 may be disposed on an upper portion of the main body 10. The control panel 30 may include a display 31 for displaying various operation information of the oven 100 and receiving a user command for controlling the operation of the oven 100. The control panel 30 may include a button 32 for receiving various user commands for controlling the operation of the oven 100.

According to an embodiment, the oven 100 may perform cooking for a cooking product in consideration of a size and a cooking status of the cooking product input to a cooking chamber.

The oven 100 may determine a cooking time for the cooking product according to the type of the cooking product selected through the control panel 30. The oven 100 may identify the size of the cooking product and determine the cooking time according to the identified size. For example, for the same kind of cooking product, the smaller the size of the cooking product, the shorter the cooking time may be determined, and the larger the size of the cooking product, the longer the cooking time may be determined.

The oven 100 may identify the cooking status of the cooking product during cooking of the cooking product, and may control cooking based on the cooking status.

Specifically, if it is identified that cooking of the cooking product is completed according to the extent of cooking of the cooking product, the oven 100 may terminate the cooking even before the set cooking time is finished. For example, if the oven 100 determines the extent of cooking, and if it is determined that the cooking product has been completed according to the extent of the cooking product, the oven 100 may terminate the cooking even before the cooking time is finished.

As described above, according to various embodiments, the cooking time may not be determined in consideration of only the kind of the cooking product, but different cooking time may be determined depending on the size of the cooking product, and the time at which the cooking is terminated according to the cooking status of the cooking product may be determined while the cooking is being performed. Accordingly, even if the user does not know the exact cooking method due to the difference of the size of the cooking product, or the like, it is possible to optimally cook the cooking product without monitoring the cooking process.

Figure 2:
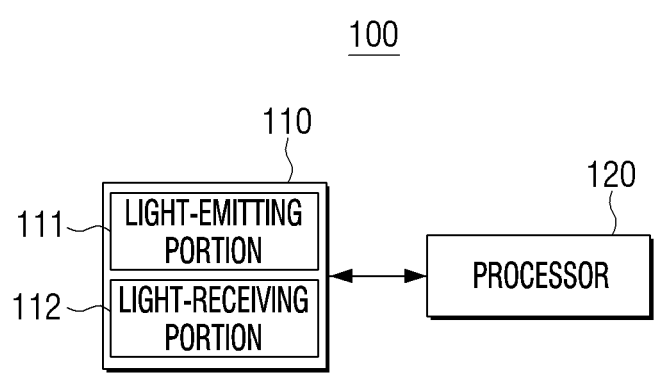
FIG. 2 is a block diagram illustrating a configuration of an oven according to an embodiment.

FIG. 2 is a block diagram illustrating a configuration of an oven according to an embodiment.

Referring to FIG. 2, the oven 100 may include a sensor 110 and a processor 120.

The sensor 110 may include a light-emitting portion 111 and a light-receiving portion 112.

In this case, the light-emitting portion 111 may output (or irradiate) the light of the first wavelength band and the light of the second wavelength band. The light-emitting portion 111 may be provided on one surface of the cooking chamber to output light to the cooking product contained in the cooking chamber.

Here, the light of the first wavelength band may include infrared rays. The light-emitting portion 111 may include an infrared light emitting diode (LED) for outputting infrared rays. In this case, the light-emitting portion 111 may include, for example, an infrared LED for outputting infrared light having a wavelength of 840 nm or 950 nm.

The light of the second wavelength band may include visible ray. The light-emitting portion 111 may include an LED to output the visible ray.

The light-emitting portion 111 may include a plurality of LEDs. The LEDs may output visible ray of different wavelengths from the visible ray wavelength band.

For example, light-emitting portion 111 may include an LED for irradiating visible ray having a wavelength of $\lambda 1$, an LED for irradiating visible ray having a wavelength of $\lambda 2$, LED for irradiating visible ray having a wavelength of $\lambda 3$, and an LED irradiating visible ray having a wavelength of $\lambda 4$. Here, $\lambda 1$ to $\lambda 4$ may have different wavelength values within approximately 380~780 nm.

In the example described above, the light-emitting portion 111 has been described as including four LEDs. However, this is an example, and the light-emitting portion 111 may include four to eight LEDs, and in accordance with an embodiment, the light-emitting portion 111 may include more than eight LEDs.

According to an embodiment, the oven 100 may include a focusing lens. Here, the focusing lens may perform a function of adjusting the direction of light output from the light-emitting portion 111 so that the light output from the light-emitting portion 111 faces the cooking product placed in the cooking chamber.

The light-receiving portion 112 may receive light reflected from a cooking product in the oven 100. When the light output from the light-emitting portion 111 is reflected or scattered from the cooking product in the cooking chamber, the light-receiving portion 112 may receive the reflected or scattered light from the cooking product.

The light-receiving portion 112 may include a plurality of light receiving modules arranged in an array format.

The light receiving module may be a photo diode. The light-receiving portion 112 may include N×M photo diodes arranged in a matrix form (here, N, M is a natural number greater than or equal to 2).

The processor 120 may control overall operations and functions of the oven 100.

The processor 120 may perform cooking of the cooking product in consideration of the size and cooking status of the cooking product in the cooking chamber.

The processor 120, based on receiving a user command to start cooking, may irradiate light of the first wavelength band through the light-emitting portion 111.

The user command for the start of cooking may include various commands. For example, a user may enter a cooking product into a cooking chamber and input a command (e.g., a command for selecting "chicken," "beef," "pork", "pizza", etc.) to select a type of the input cooking product into the oven 100. As another example, the user may input a cooking product into the cooking chamber, select the type of the cooking product input by the user, and may input a command for selecting a separate button (e.g., a start button) into the oven 100.

When the user command is inputted, the processor 120 may identify that a user command for starting cooking is input. The user command may be input through a display 31 or a button 32 provided in the oven 100.

The processor 120 may output light of the first wavelength band through a light-emitting portion 111, and when the light output from the light-emitting portion 111 is reflected from the cooking product and received at a light-receiving portion 112, the processor 120 may identify the size of the cooking product based on the received light of the first wavelength band.

The processor 120 may identify a distance between the plurality of light receiving modules and the cooking product based on the difference between the time of outputting the light in the first wavelength band by the light-emitting portion 111 and the time at which the light in the first wavelength band reflected from the cooking product is received by the plurality of light receiving modules.

The sensor 110 may include a time to digital converter (not shown).

When the light of the first wavelength band is output from the light-emitting portion 111, the time-to-digital converter may start counting of the time, and when the light in the first wavelength band is received by the light-receiving portion 112, the time-to-digital converter may terminate the time counting so as to measure the time taken for the light to be reflected from the cooking product and returned, after the light is output.

In that the light-receiving portion 112 may include a plurality of light-receiving modules arranged in an array form, the time-to-digital converter may terminate the time counting for each light-receiving module to detect a difference between the time at which the light of the first wavelength band is outputted from the light-emitting portion 111 and the time at which the light of the first wavelength band outputted from the light-emitting portion 111 is reflected from the cooking product and is received at each of the plurality of light-receiving modules.

In this example, the processor 120 may identify the distance between the plurality of light receiving modules and the cooking product based on the information on the time difference received from the sensor 110. The processor 120 may identify a distance between each of the plurality of light receiving modules and the cooking product based on a time difference measured for each light receiving module.

The processor 120 may calculate the distance between the light-receiving module and the cooking product based on Equation 1 below.

$$d = \Delta t \times c / 2 \qquad \text{[Equation 1]}$$

Here, $\Delta t$ may refer to a difference between time when light is output and received time, c may refer to speed of light, and d may refer to a distance between a light receiving module and the cooking product.

The processor 120 may identify the size of the cooking product based on the identified distance.

In detail, the processor 120 may identify the size of the cooking product based on a distance between each of the plurality of light receiving modules and the cooking product and a distance between a floor surface where the cooking product is placed and the plurality of light receiving modules.

Figure 3:
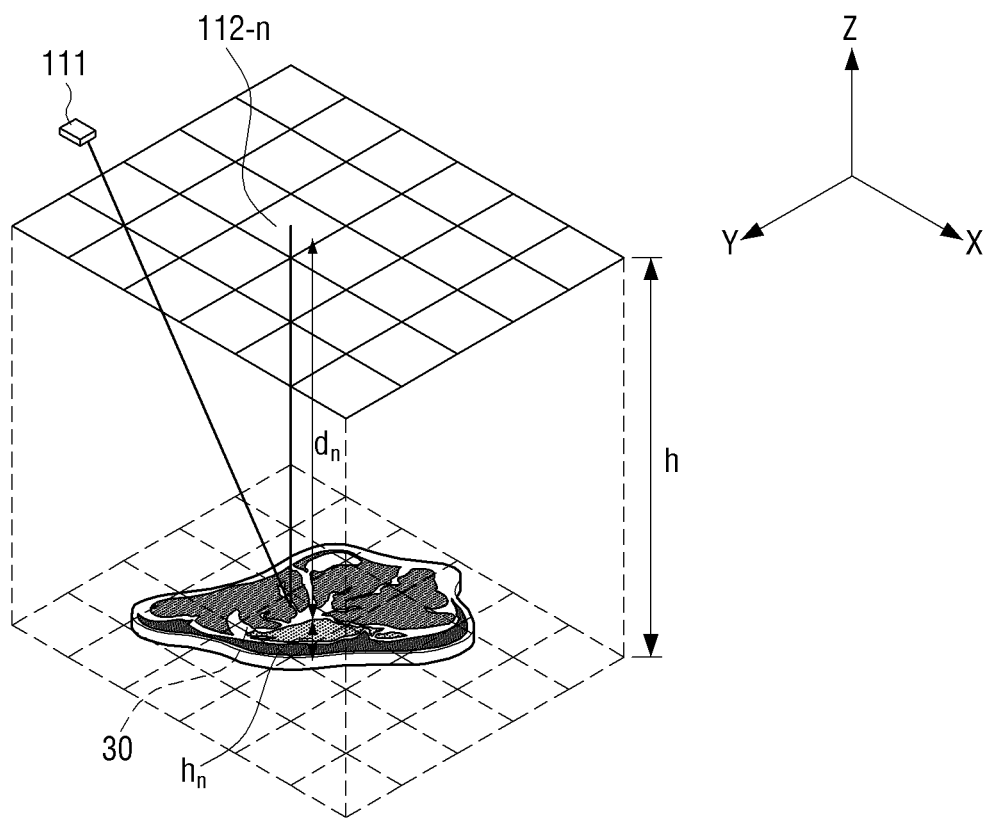
FIG. 3 is a diagram illustrating a method of identifying a size of a cooking apparatus according to an embodiment.

For example, as shown in FIG. 3, it is assumed that the plurality of light receiving modules are disposed on the upper surface of the cooking chamber, and the distance between the top surface of the cooking chamber and the bottom surface on which the cooking product is placed is h.

In this case, for example, for a light-receiving module 112-$n$ among a plurality of light-receiving modules, if the distance between the light receiving module 112-$n$ and an area 30 in which the light output from the light-emitting portion 111 is reflected from the cooking product is $d_n$, the distance $h_n$ of the reflected area 30 relative to the bottom surface may be h–$d_n$.

Accordingly, the processor 120 may, for each of the plurality of light-receiving modules, identify the size of the cooking product by summing all the distances between the area where the calculated light is reflected and the bottom surface.

However, this is merely an example, and the processor 120 may identify the size of the cooking product through various methods capable of calculating the size of the object using the distance from the object.

If the size of the cooking product is identified, the processor 120 may determine the cooking time for the cooking product based on the type of the cooking product and the identified size of the cooking product.

The cooking time matched with the type and size of the cooking product may be preset, and the information may be pre-stored in a memory (not shown) of the oven 100.

The cooking time may be set for each type of the cooking product, and a different cooking time may be set according to the size of the cooking product. Specifically, as the size of the cooking product is larger, a relatively longer cooking time may be set, and a relatively shorter cooking time may be set as the size of the cooking product is smaller.

The type of the cooking product selected according to the user command may be "chicken."

In this case, the processor 120 may determine a cooking time for the cooking product, depending on the size of the cooking product inserted into the cooking chamber.

For example, when the size of the cooking product is less than $v_1$, the processor 120 may determine the cooking time as $t_1$, when the size of the cooking product falls within the range of $v_1$-$v_2$, determine the cooking time as $t_2$, and when the size of the cooking product is greater than $v_2$, may determine the cooking time as $t_3$. Herein, $v_1 < v_2$ and $t_1 < t_2 < t_3$.

As described above, the processor 120 may determine different cooking time according to the determined size of the cooking product, based on a user command for starting cooking.

The cooking time may be set to be relatively long as the determined cooking product size is larger. In addition, the cooking time may be set to be relatively short as the determined size of the cooking product is smaller.

The processor 120 may perform cooking on the cooking product based on the determined cooking time. The processor 120 may drive a heater to heat the cooking product during the determined cooking time.

The processor 120 may display the determined cooking time on the display 31 provided on the oven 100.

The processor 120 may output light of the second wavelength band through the light-emitting portion 111 while performing the cooking for the cooking product based on the cooking time determined according to the size of the cooking product, and identify the cooking status of the cooking product on the basis of the received light of the second wavelength band when the outputted light is reflected from the cooking product and received at the light-receiving portion 112.

The processor 120 may sequentially output lights of different wavelengths in the second wavelength bad through the light-emitting portion 111 in each of the plurality of time periods.

As described above, the light-emitting portion 111 may include a plurality of LEDs that output visible ray of different wavelengths in a visible wavelength band.

In this case, the processor 120 may sequentially output light through the plurality of LEDs in each of the plurality of time periods. At this time, the time interval between the time periods may be constant.

Figure 4:
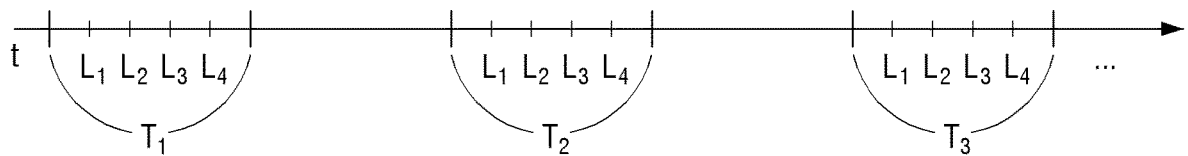
FIG. 4 is a diagram illustrating a method for sequentially outputting light of different wavelengths in each of a plurality of time periods according to an embodiment.

For example, there may be four LEDs in the light-emitting portion 111. In this case, as shown in FIG. 4, the processor 120 may sequentially output light through the four LEDs in each of the plurality of time periods.

For example, the processor 120 may output light having a wavelength of $\lambda_1$ through the first LED $L_1$ at a first time period $T_1$, output light having a wavelength of $\lambda_2$ through the second LED $L_2$, output light having a wavelength of $\lambda_3$ through the third LED $L_3$, and output light having a wavelength of $\lambda_4$ through the fourth LED $L_4$.

The processor 120 may output light having a wavelength of $\lambda_1$ through the first LED $L_1$ at a second time period $T_2$, which is after a predetermined time (e.g., after three minutes), output light having a wavelength of $\lambda_2$ through the second LED $L_2$, output light having a wavelength of $\lambda_3$ through the third LED $L_3$, and output light having a wavelength of $\lambda_4$ through the fourth LED $L_4$.

The processor 120 may output light having a wavelength of $\lambda_1$ through the first LED $L_1$ at a third time interval $T_3$, which is after a predetermined time (e.g., after three minutes), output light having a wavelength of $\lambda_2$ through the second LED $L_2$, output light having a wavelength of $\lambda_3$ through the third LED $L_3$, and output light having a wavelength of $\lambda_4$ through the fourth LED $L_4$.

In this manner, the processor 120 may sequentially output visible ray of different wavelengths in each of the plurality of time periods.

In this case, when light of different wavelengths are reflected from the cooking product and received at a plurality of light receiving modules, the processor 120 may identify the cooking status of the cooking product based on the intensity of the received light.

At this time, the processor 120 may identify a cooking status of the cooking product based on a difference in intensity of light received from the plurality of light receiving modules.

Specifically, the processor 120 may identify the wavelength having the greatest difference between the intensity of light of different wavelengths received from the plurality of light receiving modules according to the light outputted from the light-emitting portion 111 in the first time period, and the intensity of light of different wavelengths received by a plurality of light receiving modules according to the light output from the light-emitting portion 111 in a subsequent time period, of the plurality of time periods, and if the difference of the identified intensity of different wavelengths is greater than or equal to a threshold value, the processor 120 may identify that the cooking of the cooking product is completed.

The plurality of light receiving modules may include a prism or a spectral filter for separating light according to wavelength.

The processor 120 may output visible ray of different wavelengths in the first time period, and when visible ray of different wavelengths are reflected by the cooking product and received in the plurality of light receiving modules, the processor 120 may detect the intensity of light received for each wavelength.

The processor 120, and then, may output visible ray of different wavelengths in the next time period, and when visible ray of different wavelengths are reflected by the cooking product and received at the plurality of light receiving modules, the processor 120 may detect the intensity of light received for each wavelength.

The processor 120 may calculate the difference of intensity of light received by wavelengths for the first time period and the next time period.

The processor 120 may identify the wavelength having the greatest difference and may compare the difference in intensity of the identified wavelength with a predetermined threshold value. The information on the predetermined threshold value may be stored in a memory (not shown) of the oven 100, and the threshold value may be set to a different value depending on the type of the cooking product. Accordingly, the processor 120 may obtain a threshold value matched with the type of the selected cooking product according to the user command, among the predetermined threshold values.

If the difference between the intensity of the identified wavelength of light is smaller than a predetermined threshold value, the processor 120 may output visible ray having different wavelengths in the next time period. The processor 120 may detect the intensity of light received for each wavelength when the visible ray of different wavelengths outputted in the next time period is reflected by the cooking product and received at the plurality of light receiving modules.

The processor 120 may calculate the difference of intensity of light received by wavelengths for the first time period and the next period.

The processor 120 may identify the wavelength having the greatest difference and may compare the difference of intensity of light of the identified wavelength with a preset threshold value.

The processor 120, based on the difference of intensity of light of identified wavelength being greater than or equal to a threshold value, may identify that cooking of the cooking product is completed.

The processor 120 may identify the wavelength having the greatest difference and identify that cooking of the cooking product is finished, if the difference between the intensity of light of the identified wavelength is greater than or equal to a predetermined threshold value, for all the light receiving modules.

For example, in each of time periods $T_1$ to $T_3$, the visible ray having a wavelength of $\lambda_1$ to $\lambda_4$ through the first to fourth LEDs may be assumed.

Figure 5:
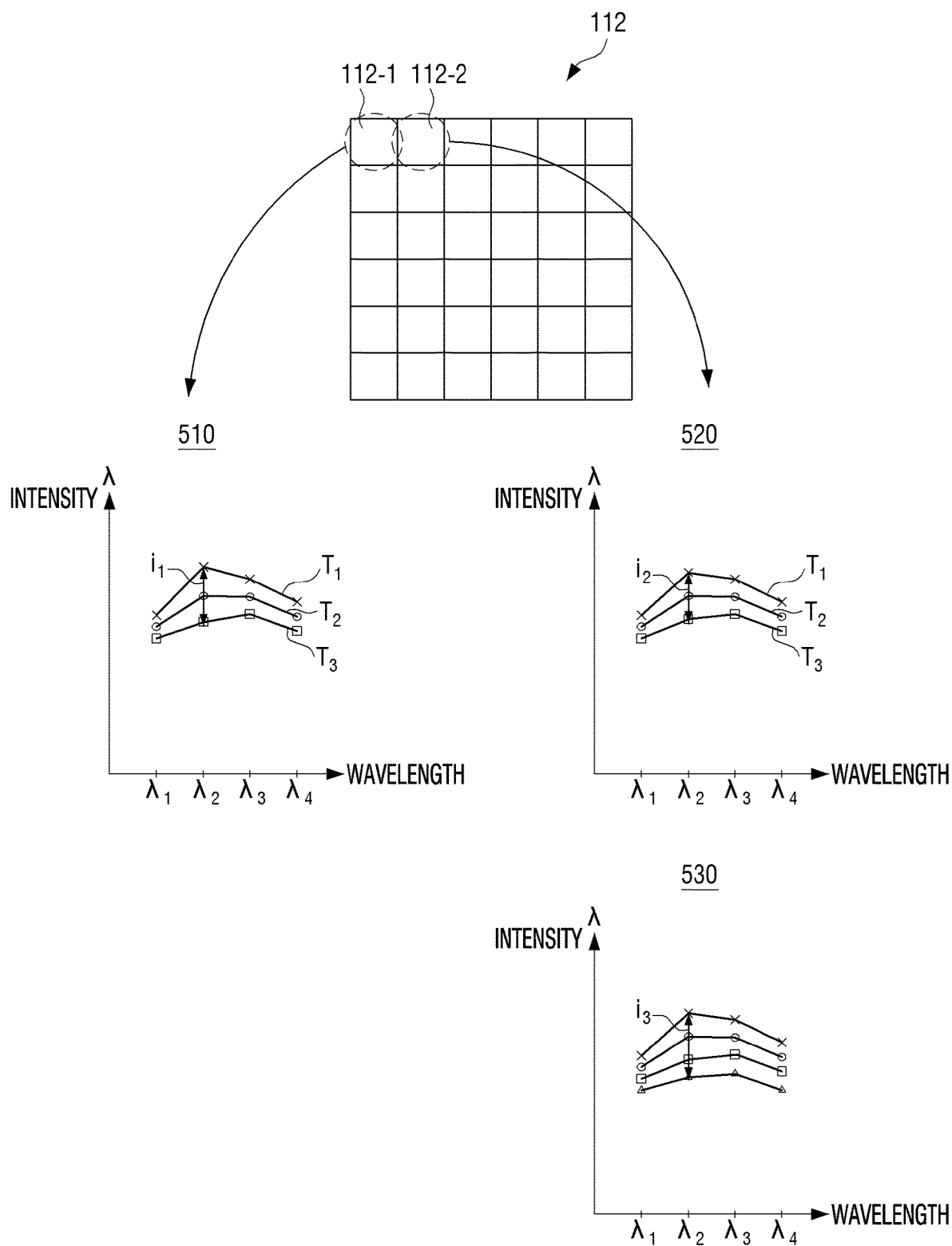
FIG. 5 is a diagram illustrating a method for identifying a cooking status of a cooking product according to an embodiment.

In this example, as illustrated in FIG. 5, the intensity of the visible ray of each wavelength received at the light receiving module 112-1 of the plurality of light receiving modules may be 510, and the intensity of the visible ray of each wavelength received at the light receiving module 112-2 of the plurality of light receiving modules may be 520.

Referring to FIG. 5, the difference i1 of the intensity of the visible ray having a wavelength of λ2 is largest among the wavelengths of λ1 to λ4, and referring to 520, it may be seen that the difference i2 of the intensity of the visible ray having a wavelength of λ2 is the largest, among the wavelengths of λ1 to λ4.

The processor 120 may identify whether $i_1$ and $i_2$ are greater than or equal to a predetermined threshold value.

Here, if $i_1$ is greater than or equal to a predetermined threshold value, but $i_2$ is less than a predetermined threshold value, the processor 120 may sequentially output visible ray having a wavelength of $\lambda_1$ to $\lambda_4$ through the first to fourth LEDs at a time period $T_4$, which is the next time period.

The processor 120 may calculate a difference between intensity of a visible ray having a wavelength of $\lambda_1$ to $\lambda_4$ received from the light receiving module 112-2 at a time period $T_1$ and intensity of a visible ray having a wavelength of $\lambda_1$ to $\lambda_4$ received from the light receiving module 112-2 at time period $T_4$.

When the difference $i_3$ of the intensity of visible ray having a wavelength of $\lambda_2$ is greatest, the processor 120 may identify whether $i_3$ is greater than or equal to a preset threshold value.

As a result, the processor 120 may identify that the cooking of the cooking product is completed when the difference between the intensity of light of the identified wavelength is greater than or equal to a predetermined threshold value, through this method.

Through the above method, the reason of identifying the cooking status of the cooking product is as shown below.

According to the heating of the cooking product, a property of the cooking product may change. According to the change of the property, the cooking product may have a relatively high absorption rate with respect to light of a specific wavelength. Accordingly, according to an embodiment, it is identified whether the cooking status of the cooking product, that is, the object is cooked, depending on the degree of absorption of the cooking product with specific wavelength of light.

The above method is merely an example, and the processor 120 may identify the cooking status of the cooking product through various methods.

The processor 120 may output visible ray having different wavelengths in a time period, and may detect the intensity of light received for each wavelength when the visible ray of different wavelengths are reflected by the cooking product and received at the plurality of light receiving modules.

The processor 120 may sum all the detected intensities of light and then normalize the summed value.

The processor 120 may calculate a difference between a normalized value and a value pre-stored in a memory (not shown) of the oven 100, and identify whether an absolute value of the calculated difference is less than or equal to a predetermined threshold value. Here, information on a pre-stored value and a predetermined threshold value may be pre-stored in a memory (not shown) of the oven 100, and these values may be set to different values depending on the type of the cooking product. Accordingly, among the pre-stored value and the predetermined threshold value, a threshold value matched with the type of the selected cooking product may be obtained according to the user command.

If the absolute value of the calculated difference is less than or equal to a predetermined threshold value, the processor 120 may identify that the cooking of the cooking product has been completed.

If the absolute value of the calculated difference is greater than a predetermined threshold value, the processor 120 may output visible ray having different wavelengths in the next time period. The processor 120 may detect the intensity of light received for each wavelength when the visible ray of different wavelengths outputted in the next time period is reflected by the cooking product and received at the plurality of light receiving modules.

The processor 120 may calculate the absolute value of the difference by performing the above-described process for the next time period, and may identify whether the calculated absolute value is less than or equal to a predetermined threshold value.

Through this method, the processor 120 may identify the cooking status of the cooking product.

If the processor 120 identifies that cooking of the cooking product is completed according to the identified cooking status, the processor 120 may stop the cooking of the cooking product. The processor 120 may stop driving of the heater that has been driven for heating the cooking product.

If the cooking is stopped, the processor 120 may display information indicating that the cooking has been completed on the display 31 provided in the oven 100, or may output a specific sound through a speaker (not shown) of the oven 100.

As described above, according to various embodiments, different cooking times may be determined depending on the size of the cooking product, and the time at which the cooking is terminated according to the cooking status of the cooking product may be determined while the cooking is being performed.

Accordingly, even if the user does not know the exact cooking method due to the difference of the size of the cooking product, once the user selects a type of the cooking product to be cooked, the user may optimally cook the cooking product without monitoring the cooking process.

According to various embodiments, it is possible to identify both the size and cooking status of the cooking product using one sensor including a light-emitting portion for outputting light and a light-receiving portion for receiving light without a separate additional sensor.

Figure 6:
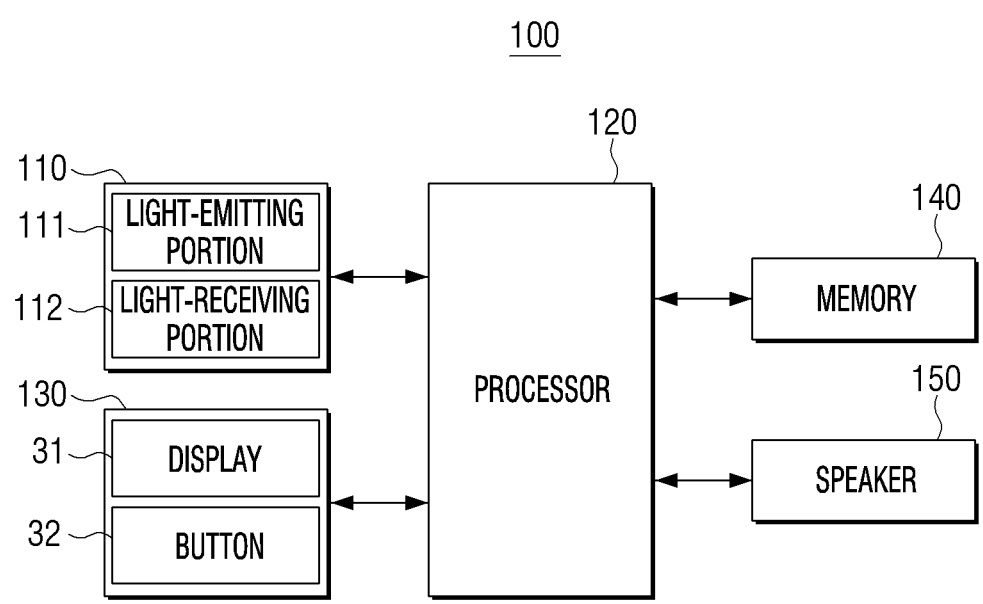
FIG. 6 is a block diagram illustrating a configuration of an oven in detail according to an embodiment.

FIG. 6 is a block diagram illustrating a configuration of an oven in detail according to an embodiment.

As shown in FIG. 6, the oven 100 may include the sensor 110, the processor 120, an input interface 130, a memory 140, and a speaker 150. The components shown in FIG. 6 may be controlled by the processor 120. Since the sensor 110 and the processor 120 shown in FIG. 6 have been described in FIG. 2, a description thereof will be omitted.

The input interface 130 may receive a user command to control the oven 100.

The input interface 130 may include a display 31 implemented as a touch screen together with the touch panel to receive a user touch, and a button 32 for receiving a user operation. The display 31 may display various screens. For example, the display 31 may display information on a cooking time and the like.

The example of the input interface 130 of FIG. 6 is merely exemplary, and the input interface 130 may include a microphone (not shown) for receiving a user voice and other input devices (e.g., a keyboard, a mouse, a motion inputter, etc.), or the like.

The memory 140 may store various data for operating the oven 100. The memory 140 may store data, or the like, related to at least one another component of the oven 100.

The memory 140 may be a non-volatile memory, a volatile memory, a flash memory, a hard disk drive (HDD), or a solid state drive (SSD). The memory 140 may be accessed by the processor 120, and read/write/modify/update data by the processor 120 may be performed. The term memory may include the memory 140, the ROM (not shown), RAM (not shown) in the processor 120, or a memory card (not shown) (e.g., a micro secure digital (SD) card, a memory stick) mounted in the oven 100.

The speaker 150 is configured to output various notification sound or voice messages as well as audio data. When the cooking of the cooking product in the oven 100 is completed, the speaker 150 may output audio to inform the user of the completion of the cooking.

FIG. 7 is a flowchart illustrating a method of describing a cooking method of an oven according to an embodiment.

The light-emitting portion and the light-receiving portion of the oven may be included.

Based on a user command for initiating cooking being input, the light in the first wavelength band is output through the light-emitting portion in operation S710. The light in the wavelength band may be infrared rays.

Based on the light output from the light-emitting portion being reflected from the cooking product and received by the light-receiving portion, a size of the cooking product may be identified based on the received light in the first wavelength band in operation S720.

The light in the second wavelength band may be output through the light-emitting portion while the cooking product is being cooked based on a cooking time determined according to the identified size of the cooking product in operation S730. The light in the second wavelength band may be visible ray.

Based on the output light being reflected from the cooking product and received by the light-receiving portion, a cooking status of the cooking product may be identified based on the received light in the second wavelength band in operation S740.

The cooking product may be cooked based on the identified cooking status in operation S750.

The light-receiving portion may include a plurality of light-receiving modules arranged in a form of an array.

In operation S720, based on a difference between a time at which the light in the first wavelength band is output from the light-emitting portion and a time at which the light in the first wavelength band is reflected from the cooking product and received by the plurality of light receiving modules, a distance between the plurality of light receiving modules and the cooking product may be identified, and a size of the cooking product may be identified based on the identified distance.

The different cooking times may be determined according to the identified size of the cooking product for a type of a cooking product selected based on a user command to initiate the cooking, and the greater the identified size of the cooking product is, the longer the cooking time is.

In operation S740, lights of different wavelengths in the second wavelength band may be sequentially output through the light-emitting portion in each of a plurality of time periods, and based on the lights of different wavelengths being reflected from the cooking product and received by the plurality of light receiving modules, a cooking status of the cooking product may be identified based on an intensity of the received light.

In operation S740, the cooking status of the cooking product may be identified based on the difference of intensity of light received at a plurality of light receiving modules.

More specifically, according to the light output from the light-emitting portion in the first time period of the plurality of times, the wavelength having the greatest difference between the intensity of light of different wavelengths received from the plurality of light-receiving modules and the intensity of the light output from the light-emitting portion may be identified, and if the difference between the intensity of the identified wavelength of light is greater than or equal to a predetermined threshold value, it may be identified that the cooking of the cooking product has been completed.

If it is identified that cooking of the cooking product is completed according to the identified cooking status, cooking of the cooking product may be stopped.

A specific method of identifying the size and cooking status of the cooking product may be identified using the light of the first wavelength band and light of the second wavelength band, and performing cooking for the cooking product has been described above.

The term "unit" or "module" used in the disclosure includes units consisting of hardware, software, or firmware, and is used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

The various example embodiments as described above may be implemented with software including instructions stored in the machine-readable storage media readable by a machine (e.g., a computer). A machine is a device which may call instructions from the storage medium and operate according to the called instructions, and may include an electronic device (example: oven 100) of the embodiments. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. Play Store™) directly between two user devices (e.g., smartphones). In the case of on-line distribution, at least a portion of the computer program product may be stored temporarily or at least temporarily in a storage medium such as a manufacturer's server, a server of an application store, or a memory of a relay server.

Each of the components (for example, a module or a program) according to one or more embodiments may be composed of one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Further, various features from various different embodiments may be combined. Operations performed by a module, program, or other component, in accordance with embodiments, may be performed sequentially, in parallel, repetitive, or heuristic manner, or at least some operations may be performed in a different order, omitted, or other operations can be added.

What is claimed is:

1. An oven comprising:
a sensor including a light-emitting portion for outputting light in a first wavelength band and light in a second wavelength band and a light-receiving portion for receiving light reflected from a cooking product in the oven; and
a processor configured to:
based on a user command for initiating cooking being input, output the light in the first wavelength band through the light-emitting portion, and based on the light output from the light-emitting portion being reflected from the cooking product and received by the light-receiving portion, identify a size of the cooking product based on the light received in the first wavelength band,
sequentially output lights of different wavelengths in the second wavelength band through the light-emitting portion in each of a plurality of time periods while the cooking product is being cooked based on a cooking time determined according to the identified size of the cooking product,
based on the lights of different wavelengths being reflected from the cooking product and received by the light-receiving portion, identify a cooking status of the cooking product based on a difference of an intensity of the light received by the light-receiving portion, and
cook the cooking product based on the identified cooking status.

2. The oven of claim 1, wherein the light in the first wavelength band is infrared rays, and the light in the second wavelength band is visible ray.

3. The oven of claim 1, wherein the light-receiving portion comprises a plurality of light-receiving modules arranged in a form of an array.

4. The oven of claim 3, wherein the processor is further configured to:
based on a difference between a time at which the light in the first wavelength band is output from the light-emitting portion and a time at which the light in the first wavelength band is reflected from the cooking product and received by the plurality of light-receiving modules, identify a distance between the plurality of light-receiving modules and the cooking product, and identify a size of the cooking product based on the identified distance.

5. The oven of claim 1, wherein the processor is further configured to determine different cooking times according to the identified size of the cooking product for a type of a cooking product selected based on the user command for initiating cooking, and
wherein as the identified size of the cooking product is larger, a cooking time of the different cooking times is longer.

6. The oven of claim 3, wherein the processor is further configured to:
identify a wavelength having a greatest difference between an intensity of lights of different wavelengths received by the plurality of light-receiving modules according to the light output from the light-emitting portion in a first time period and an intensity of lights of different wavelengths received by the plurality of light-receiving modules according to the light output from the light-emitting portion in a subsequent time period, and based on the greatest difference being greater than or equal to a preset threshold value, identify that cooking of the cooking product is completed.

7. The oven of claim 1, wherein the processor is further configured to, based on identifying that cooking of the cooking product is completed according to the identified cooking status, stop cooking of the cooking product.

8. A method of cooking of an oven including a light-emitting portion and a light-receiving portion, the method comprising:
based on a user command for initiating cooking being input, outputting light in a first wavelength band through the light-emitting portion;
based on the light output from the light-emitting portion being reflected from a cooking product and received by the light-receiving portion, identifying a size of the cooking product based on the light received in the first wavelength band;
sequentially outputting lights of different wavelengths in a second wavelength band through the light-emitting portion in each of a plurality of time periods while the cooking product is being cooked based on a cooking time determined according to the identified size of the cooking product;
based on the lights of different wavelengths being reflected from the cooking product and received by the light-receiving portion, identify a cooking status of the cooking product based on a difference of an intensity of the light received by the light-receiving portion; and
cooking the cooking product based on the identified cooking status.

9. The method of claim 8, wherein the light in the first wavelength band is infrared rays, and the light in the second wavelength band is visible ray.

10. The method of claim 8, wherein the light-receiving portion comprises a plurality of light-receiving modules arranged in a form of an array.

11. The method of claim 10, wherein the identifying a size of the cooking product comprises, based on a difference between a time at which the light in the first wavelength band is output from the light-emitting portion and a time at which the light in the first wavelength band is reflected from the cooking product and received by the plurality of light-receiving modules, identifying a distance between the plurality of light-receiving modules and the cooking product, and identifying a size of the cooking product based on the identified distance.

12. The method of claim 8, further comprising:
determining different cooking times according to the identified size of the cooking product for a type of a cooking product selected based on the user command for initiating cooking,
wherein as the identified size of the cooking product is larger, a cooking time of the different cooking times is longer.

* * * * *